(12) United States Patent
Schmidt et al.

(10) Patent No.: US 6,206,489 B1
(45) Date of Patent: Mar. 27, 2001

(54) METHOD AND DEVICE FOR CHECK-TESTING A BRAKING SYSTEM

(75) Inventors: Guenther Schmidt, Tauberbischofsheim; Juergen Binder, Stuttgart; Hermann Winner, Karlsruhe; Ulrich Gottwick, Stuttgart, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/252,759

(22) Filed: Feb. 19, 1999

(30) Foreign Application Priority Data

Feb. 21, 1998 (DE) .............................................. 198 07 367

(51) Int. Cl.⁷ ...................................................... B60T 8/88
(52) U.S. Cl. ........................................ 303/122.08; 303/11
(58) Field of Search ........................ 303/10, 11, 122.08, 303/122.07, 122.09–122.14

(56) References Cited

U.S. PATENT DOCUMENTS

| | | | |
|---|---|---|---|
| 4,085,979 | * | 4/1978 | Leiber et al. .................. 303/122.08 |
| 4,484,784 | * | 11/1984 | Leiber ............................ 303/122.08 |
| 4,824,182 | * | 4/1989 | Steffes et al. .................. 303/122.08 |
| 5,713,643 | * | 2/1998 | Esselbrugge et al. ......... 303/122.08 |

FOREIGN PATENT DOCUMENTS 2-155867 * 6/1990 (JP) .
4-243655 * 8/1992 (JP) ................................ 303/122.08

OTHER PUBLICATIONS

W. Jonner et al., "Electrohydraulic Brake System—The First Approach to Brake–By–Wire Technology", Paper No. 960991, SAE Technical Paper Series, Feb. 1996, pp. 105–112.

* cited by examiner

*Primary Examiner*—Matthew C. Graham
(74) *Attorney, Agent, or Firm*—Kenyon & Kenyon (57) ABSTRACT

A method and a device for check-testing a braking system in which, before travel commences, a self-test of the braking system is performed. During the course of the self-test, the valve arrangements allocated to the wheel brakes and the pressure supply providing the brake pressure are driven in a predefined manner. A plurality of test phases are provided, after whose respective conclusions, a pressure level to be expected should be reached. Otherwise a secondary braking operation is initiated at least for the subsequent operating cycle of the vehicle.

18 Claims, 7 Drawing Sheets

METHOD AND DEVICE FOR CHECK-TESTING A BRAKING SYSTEM

BACKGROUND INFORMATION

A publication—SAE (Society of Automotive Engineers) paper 960991—describes a conventional electrohydraulic braking system, in which a driver braking input is derived from the actuation of the brake pedal by the driver. This braking input is converted, in view of further operating variables, into setpoint brake pressures for the individual wheel brakes. The setpoint braking pressures are adjusted for each wheel by closed pressure-control loops on the basis of the predefined setpoint pressure, and of the actual brake pressure measured in the area of the wheel brake. In such braking systems, the braking force at the wheels is adjusted on the basis of electrically controllable valve arrangements as a function of the driver braking input. In this context, special attention must be given to the performance reliability and availability of the system. Therefore, in the above-described publication, during the initialization of the braking system, a so-called predrive check is carried out, during which brake pressure is built up in the wheel brakes and compared to sensor information. A particular form of this predrive check is not described.

One of the objects of the present invention is to provide measures for check-testing a braking system within the framework of a predrive check, by which all necessary components of the braking system can be tested for a correct method of functioning.

SUMMARY OF THE INVENTION

The present invention provides a predrive check for an electronically controllable braking system, during which all necessary components of the braking system can be tested. It is advantageous that during the initialization of the braking system, the wheel calipers are acted upon briefly with pressure according to a definitively predefined pattern, and pressure limiting values are sampled at specific points of time. If the pressure characteristic ascertained in this manner falls characteristically out of the framework, i.e. pressure limiting values are exceeded or undershot, a fault is inferred from this, and the braking system is completely or partially switched off. In this manner, both the performance reliability and the availability of the braking system are significantly improved.

It is also advantageous that both the capability of the system for pressure regulation to different pressure levels in the wheel brakes of one axle, and the build-up to the accumulator pressure level are tested. In this manner, all essential functions of the braking system are checked for correctness.

BRIEF DESCRIPTION OF THE DRAWINGS

FIG. 4b shows a second portion of the flow chart illustrated in FIG. 4a.

FIG. 4c shows a third portion of the flow chart illustrated in FIG. 4a.

DETAILED DESCRIPTION

Figure 1:
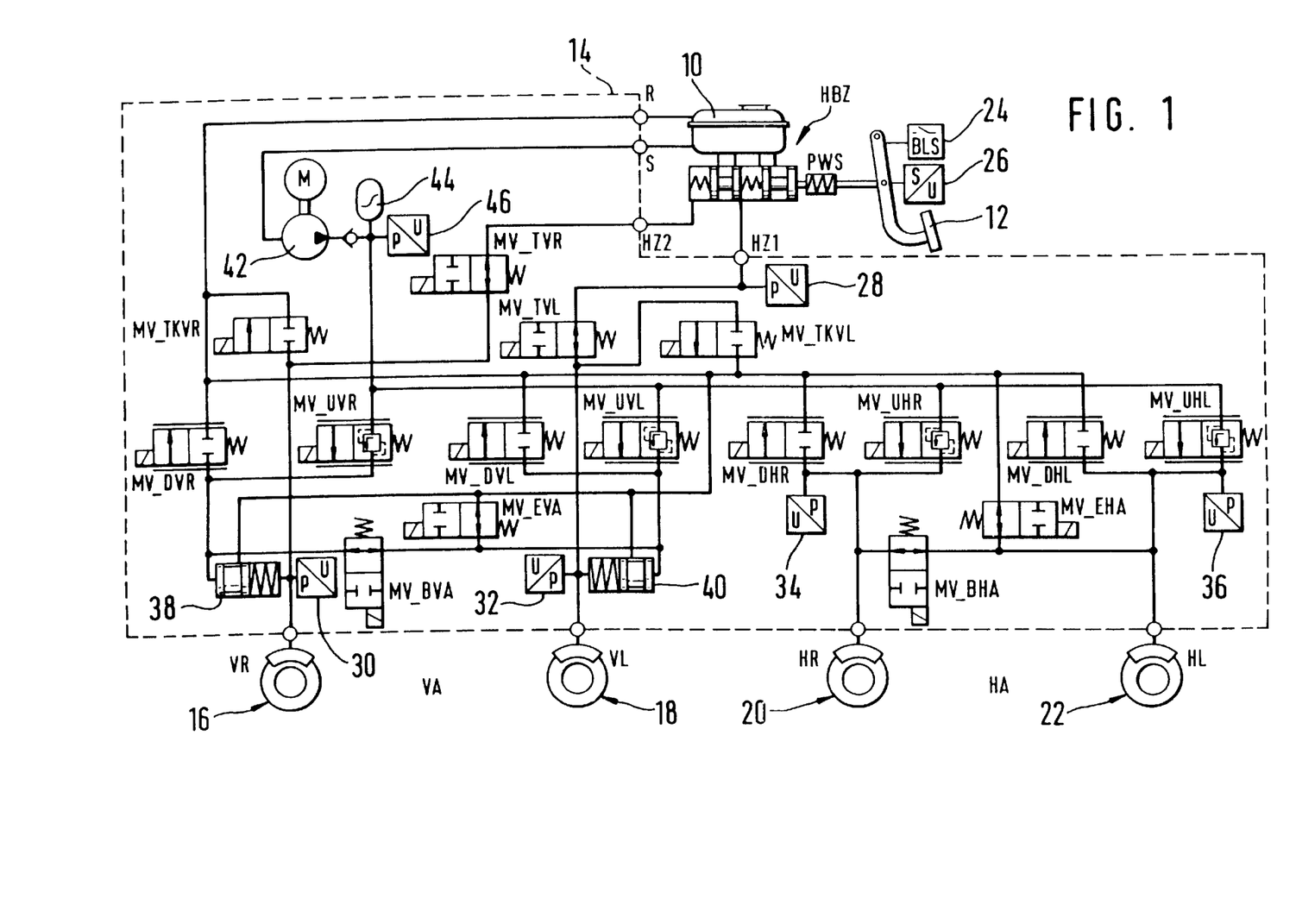
FIG. 1 shows an exemplary embodiment of an electro-hydraulic braking system according to the present invention.

FIG. 1 shows an exemplary embodiment of an electro-hydraulic braking system. In particular, FIG. 1 shows a master brake cylinder HBZ having a reservoir 10, to which is attached a brake pedal, operable by the driver. In addition, the electrohydraulic braking system includes a hydraulic aggregate (e.g., a hydraulic modulator) 14 which has valve and pump arrangements for controlling wheel brakes 16, 18, 20 and 22. Connected to brake pedal 12 is a brake-pedal switch 24 which closes in response to the actuation of the brake pedal, and a measuring device 26 for detecting the deflection of the brake pedal. Brake-pedal switch 24 can be designed as a simple make-contact element, or, to improve the monitoring ability, as a double switch having a break-contact element and a make-contact element. In addition, a pedal-travel simulator PWS is provided which, in response to actuation of a brake pedal 12, simulates for the driver a customary feeling of brake pedal 12 with respect to counteracting force and pedal deflection. Connected to master brake cylinder HBZ are the two brake circuits HZ1 and HZ2. Inserted in brake circuits HZ1 and HZ2 are separating block valves MV_TVR and MV_TVL, respectively, which, in an electrically controlled braking system, are closed by receiving current. Upstream of the separating valve, in at least one of the brake circuits, a pressure sensor 28 measures the pressure applied by the driver via the brakepedal actuation. When the separating valves are closed, master brake cylinder HBZ is hydraulically separated from the pressure-regulating system. One pressure modulator for regulating braking pressure is included for each wheel brake in the pressure-regulating system. Each pressure modulator is composed of one intake valve (MV_UR, MV_UVL, MV_UHR, MV_UHL), one discharge valve (MV_DVR, MV_DVL, MV_DHR, MV_DHL) and one pressure sensor 30, 32, 34 and 36 which measures the pressure in the line leading to the wheel brake. One of media-isolating pistons 38 and 40, respectively, is located in the two front-wheel pressure modulators, between the valves (intake and outlet valve) and the pressure sensors or the wheel brake. The pressure modulators are connected via balance valves MV_BVA and MV_BHA which, in response to receiving current, can be controlled independently of one another. Also provided for each axle are relief valves MV_EVA and MV_EHA, respectively, which, when not receiving current, permit the reduction in pressure from the wheel pressure modulators of one axle. They connect the pressure modulators of one axle to the feedback lines running to reservoir 10. In the electrically controlled operating state, these two valves are permanently current-receiving, i.e. closed. A temperature-compensation valve (i.e., MV_TKVL and MV_TKVR) is provided for each front-wheel pressure modulator. These valves are closed, in a state of receiving no current, and are opened, by receiving current, for reducing pressure from the pressure modulator of one front wheel when certain conditions, e.g., a very long braking duration, exist. The temperature-compensation valves connect the brake line to the wheel brake, with the return line. The energy for the brake-pressure modulation comes from a single-piston high-pressure pump 42 driven by an electromotor M. High-pressure pump 42 is connected to a high-pressure accumulator 44, which is used as an intermediate buffer, and whose pressure is detected by a pressure sensor 46. The pressure line of pump 42 runs to the intake valves of the wheel brakes, while the suction line of pump 42 is connected to reservoir 10. The exemplary embodiment of the present invention shown in FIG. 1 provides exemplary details of the hydraulic circuitry.

However, the process according to the present invention, as described below, is advantageously used not only in conjunction with such a hydraulic circuit, and also everywhere where, in connection with an electrically controlled braking system having electrically controllable pressure supply, the pressure in an accumulator element is detected and is drawn upon for controlling the braking system.

The temperature-compensation valves and the relief valves can be omitted in one exemplary embodiment.

During a normal operation, the braking system shown in FIG. 1 functions as follows. The driver steps on the brake pedal. In so doing, the driver feels a counteracting force dependent on the pedal travel. This travel-dependency is formed by the defined characteristic property of the pedal-travel simulator. In response to sensing a driver braking input via the pedal-travel sensor, the brake-pedal switch and/or the pressure sensor, separating valves (MV_TVR and MV_TVL) and relief valves (MV_EVA and MV_EHA) are closed. A pressure resulting from the pedal force builds up in master brake cylinder HBZ. The braking input of the driver is calculated from the signals of brake-lights switch 24 (e.g., a brake-pedal switch), travel sensor 26 and/or pressure sensor 28 as, e.g., a setpoint deceleration or as a setpoint braking force. The individual setpoint wheel-brake pressures are formed from this braking input. These pressures are modified depending on the driving and slippage conditions and are adjusted via the wheel pressure modulators due to current flowing through the valves. In the closed control loop, the prevailing pressures at the wheel pressure sensors are retrieved for the setpoint-actual adjustment for each wheel brake. In response to different setpoint pressures in the left and right wheel of an axle, the equalizing valves are closed, and in each wheel brake, the predefined setpoint pressure is adjusted by driving the intake and discharge valves along the lines of a closed-loop control of the actual brake pressure to the setpoint brake pressure. To build up pressure at a wheel brake, the intake valve is traversed by current to the extent that the desired setpoint pressure develops in the wheel brake, producing the desired dynamic response. Pressure is decreased in a corresponding manner by current flowing through the discharge valves, brake fluid flowing back into the reservoir via the return line. The relief valves come into effect in case of a fault in the system. If, during a braking operation, the electrical system fails, all the valves revert to their state of receiving no current. The relief valves then open the pressure modulators to the return line, so that no braking pressure can be locked in. In the same way, in the quiescent state, these valves permit the compensatory volume flow to the reservoir in response to temperature fluctuations.

Pump 42 is actuated in response to an active braking process and/or, in the event the accumulator pressure in accumulator 44 falls below a predefined value. In addition to this function, the accumulator pressure determined by pressure sensor 46 is also evaluated within the framework of the closed-loop control, since it essentially represents the pressure present at the entry of the intake valves.

Figure 2:
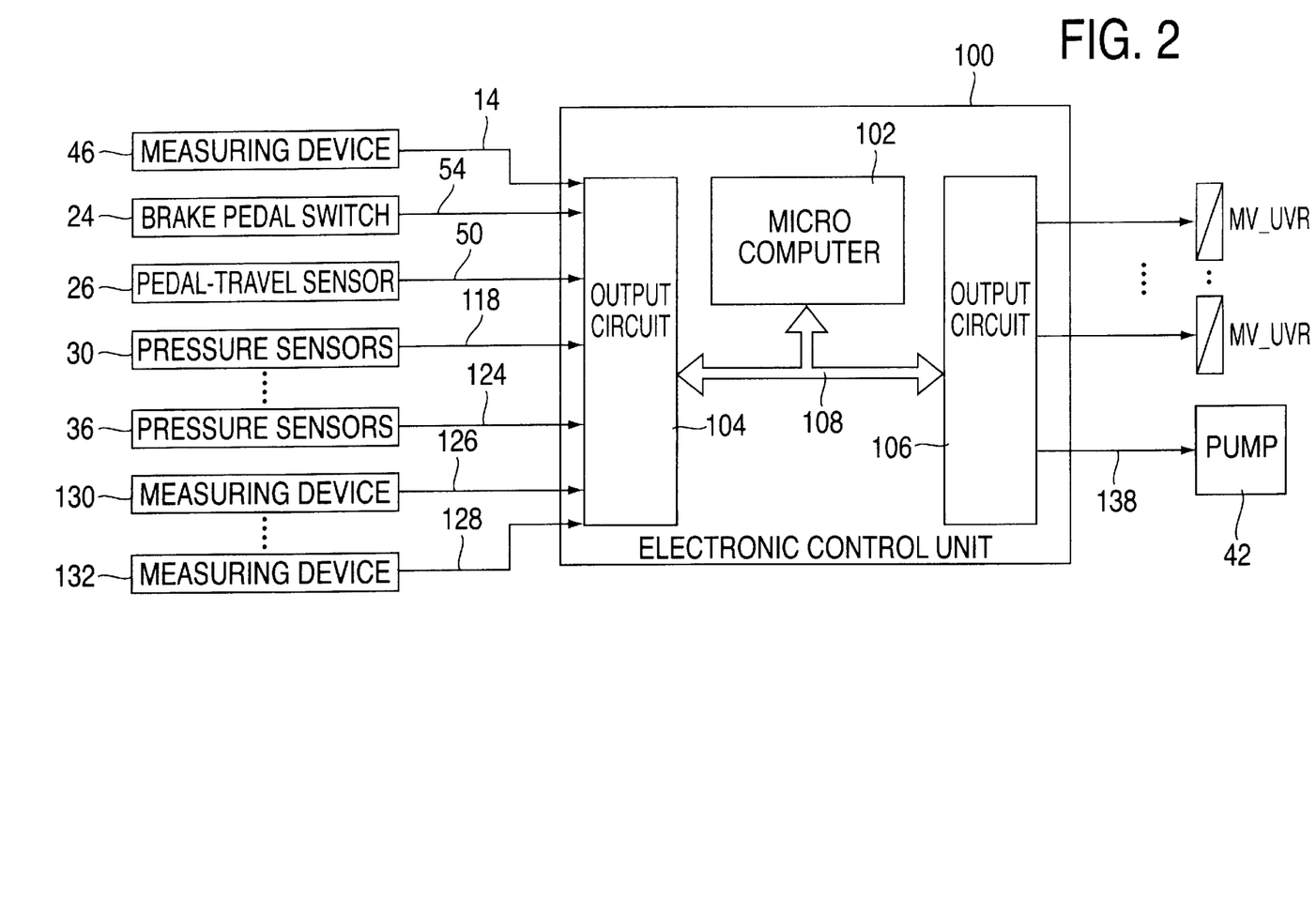
FIG. 2 shows a control unit controlling the electrohydraulic braking system illustrated in FIG. 1.

The electrically operable valves and pump 42 are driven by at least one electronic control unit 100, shown in FIG. 2. This electronic control unit 100 includes at least one microcomputer 102, at least one input circuit 104, at least one output circuit 106, and a bus system 108 linking these elements for mutual data exchange. Lines 50 and 54 run from brake-pedal switch 24 and pedal-travel sensor 26 to input circuit 104. In addition, input lines 118 through 124 connect input circuit 104 to pressure sensors 30 through 36 allocated to each wheel brake. An input line 14 which runs from measuring device 46 for detecting the accumulator pressure to input circuit 104. Further input lines 126 through 128 connect input circuit 104 to measuring devices 130 through 132 for detecting further operating variables of the braking system, of the vehicle and/or of its drive unit. Such operating variables are, e.g., the wheel velocities, the motor torque supplied by the drive unit, axle loads, the pressure in the brake line (sensor 28), etc. A plurality of output lines are connected to output circuit 106. Shown, for example, are the output lines, via which the valves of the pressure modulators are actuated. Pump 42 is driven via a further output line 138. Control unit 100 controls the braking system as a function of the supplied signal variables (e.g., using their amplitude), along the lines presented above.

Figure 3A:
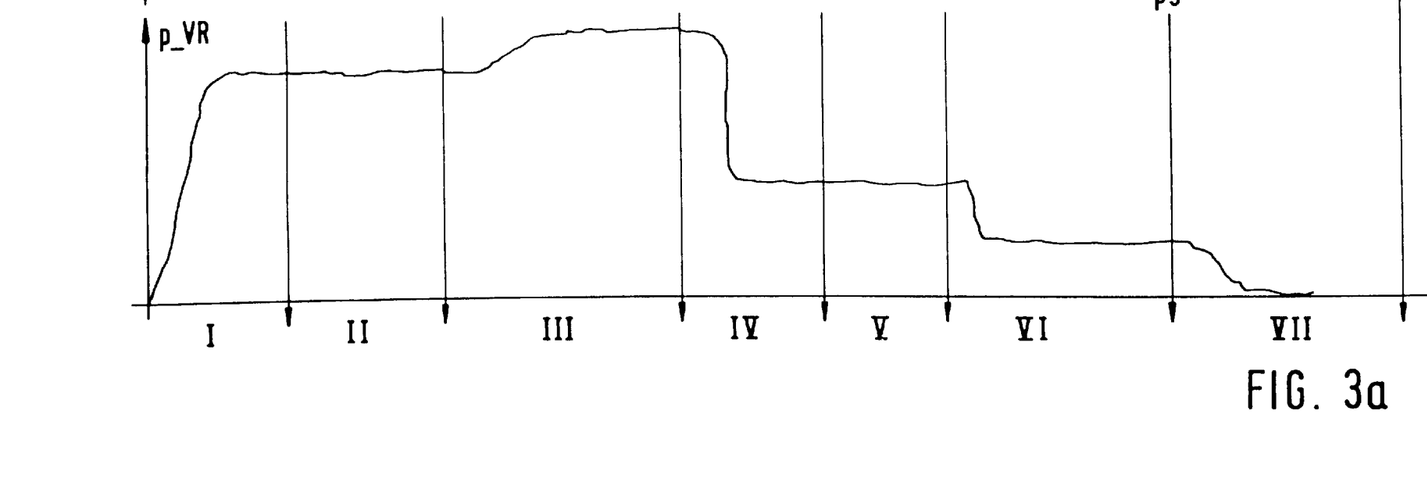
FIG. 3a shows a timing diagram (not to scale) which represent an anticipated characteristic of a pressure in a right front wheel brake when performing a predrive test and during a faultless operation of the electrohydraulic braking system.
Figure 3B:
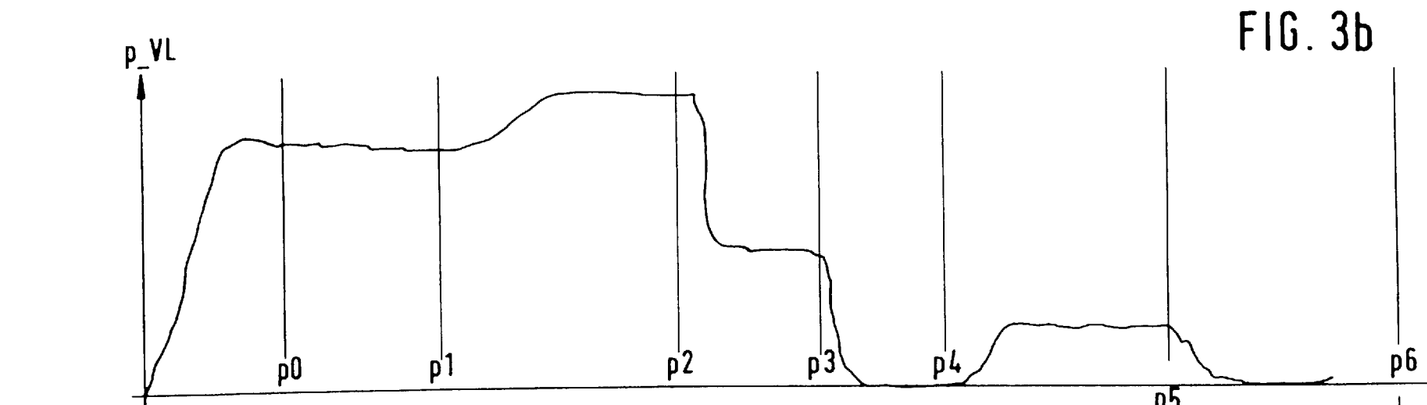
FIG. 3b shows a timing diagram (not to scale) which represent an anticipated characteristic of a pressure in a left front wheel brake when performing the predrive test and during the faultless operation of the electrohydraulic braking system.
Figure 3C:
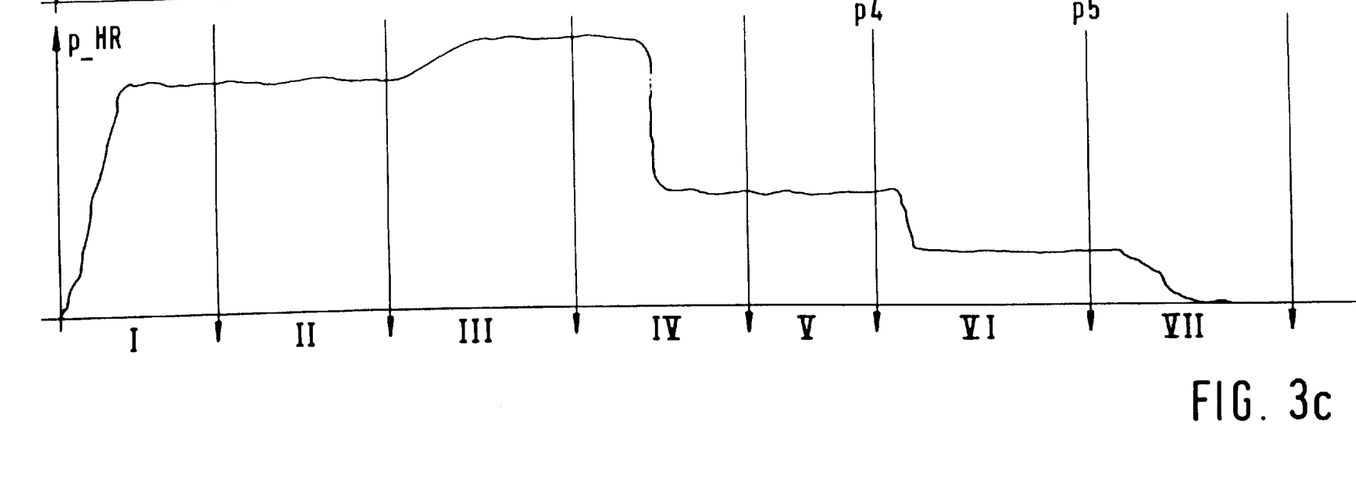
FIG. 3c shows a timing diagram (not to scale) which represent an anticipated characteristic of a pressure in a right rear wheel brake when performing the predrive test and during the faultless operation of the electrohydraulic braking system.
Figure 3D:
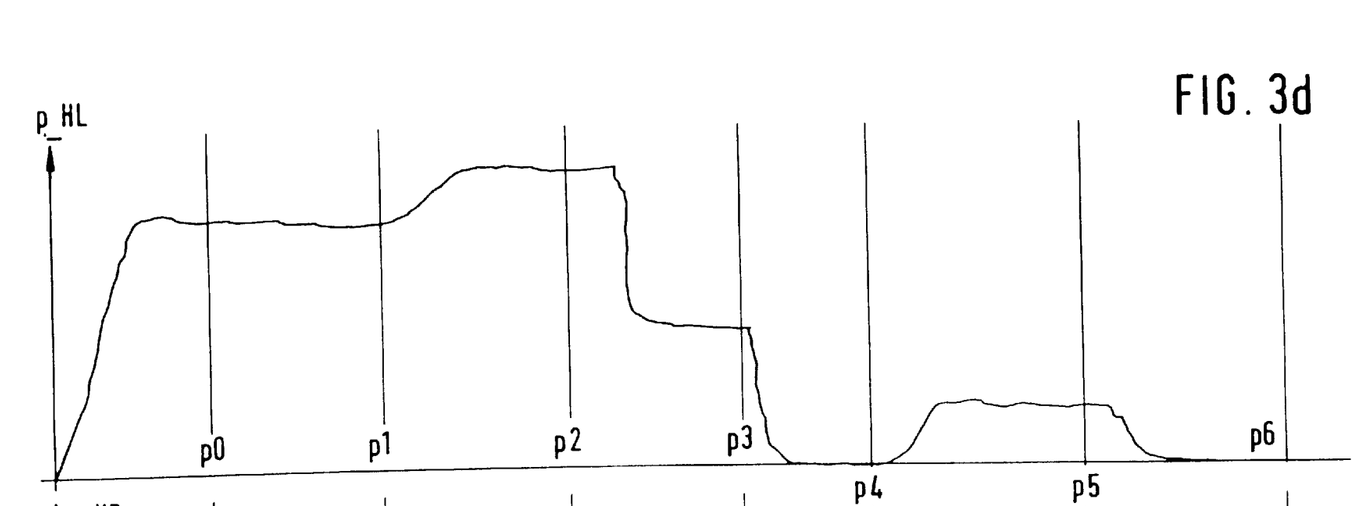
FIG. 3d shows a timing diagram (not to scale) which represent an anticipated characteristic of a pressure in a left rear wheel brake when performing the predrive test and during the faultless operation of the electrohydraulic braking system.

FIGS. 3a–3d show pressure characteristic approximately achieved during the self-test in the normal case for the exemplary embodiment according to the present invention. FIG. 3a shows the pressure characteristic for the right front wheel, FIG. 3b—for the left front wheel, FIG. 3c for the right rear wheel, and FIG. 3d—for the left rear wheel.

With the system receiving current, during a first phase I, by opening intake valves MV_Uxx, accompanied by closed pressure-reduction valves MV_Dxx and separating valves MV_Txx and balance valves MV_Bxx, the pressure in the wheel brakes is built up in a regulated manner to the accumulator pressure level, i.e., is increased via the pressure regulator as a function of the deviation between the setpoint pressure and the actual pressure within the framework of a ramp. After a predefined time has expired, within which the accumulator pressure level is reached at the wheel brakes in a system ready for operation, a check is made as to whether pressure level PO to be expected is reached at each wheel brake. If this is the case, in a second phase II, balance valves MV_Bxx are opened. At the next point of time, it is checked whether pressure level Pi to be expected is approximately present at the wheel brakes. If this is the case, an adjustment of the pressure sensors of the wheel brakes and of the accumulator pressure sensor is carried out, in that, for example, a gain value is stored for each pressure sensor, the gain value corresponding to the deviation from a predefined standard value. An offset value of the pressure sensors is ascertained in the pressureless state. After correct execution of phase II, accumulator pressure pump 42 is switched on within the framework of phase III. In an error-free operation, this leads to a pressure rise in the wheel brakes, as shown in FIGS. 3a through 3d. If, for example, due to a poor venting of the braking system, media isolators 38 and 40 are at the end stop, this is detected by the missing pressure build-up at the front wheels, and the pressure-sensor adjustment is not carried out. After a specific time has elapsed, a check is made as to whether pressure level P2 to be anticipated is reached at the wheel brakes. If this is the case, pressure is reduced during a phase IV, in that respective pressure-reduction valves MV_Dxx allocated to the wheel brakes are opened in a regulated manner for a specific time. In error-free operation, this should result in a reduction in pressure to a predetermined pressure level, e.g., 100 bar. After phase IV has elapsed, the pressure level is checked with reference to predefined pressure-level value P3. If this check-test has also run through faultlessly, the pressure in the left front-wheel brake and the left rear-wheel brake is reduced to 0 by opening the corresponding relief valve (if present) at the left front wheel and at the left rear wheel, accompanied by a closed discharge valve at the right front wheel and at right rear wheel (MV_DVL, MV_DHL), while the pressure in the right front-wheel brake and in the right rear-wheel brake is held to a predetermined level (P3). To that end, balance valves MV_Bxx must be closed. Phase V is concluded after a predetermined time, it being checked whether predefined pressure levels P4 were reached. If this is also the case, in phase VI, pressure is balanced at the axles by opening balance valves MV_Bxx. After a predetermined time, it is checked whether pressure level P5 to be expected—25 bar in a preferred exemplary embodiment—was reached. If this is the case, during phase VII, the separating valves and, at the rear-axle brakes, the pressure-reduction valves, respectively, are opened, and at the conclusion of the self-test, the pressure in all wheel brakes is reduced to 0. At the end of phase VII, predefined pressure level P6 (0 bar) is compared, and the normal operation of the braking system is released (e.g., enabled) within the framework of the electrohydraulic closed-loop control if the wheel pressure was completely reduced at all wheels.

Figure 4A:
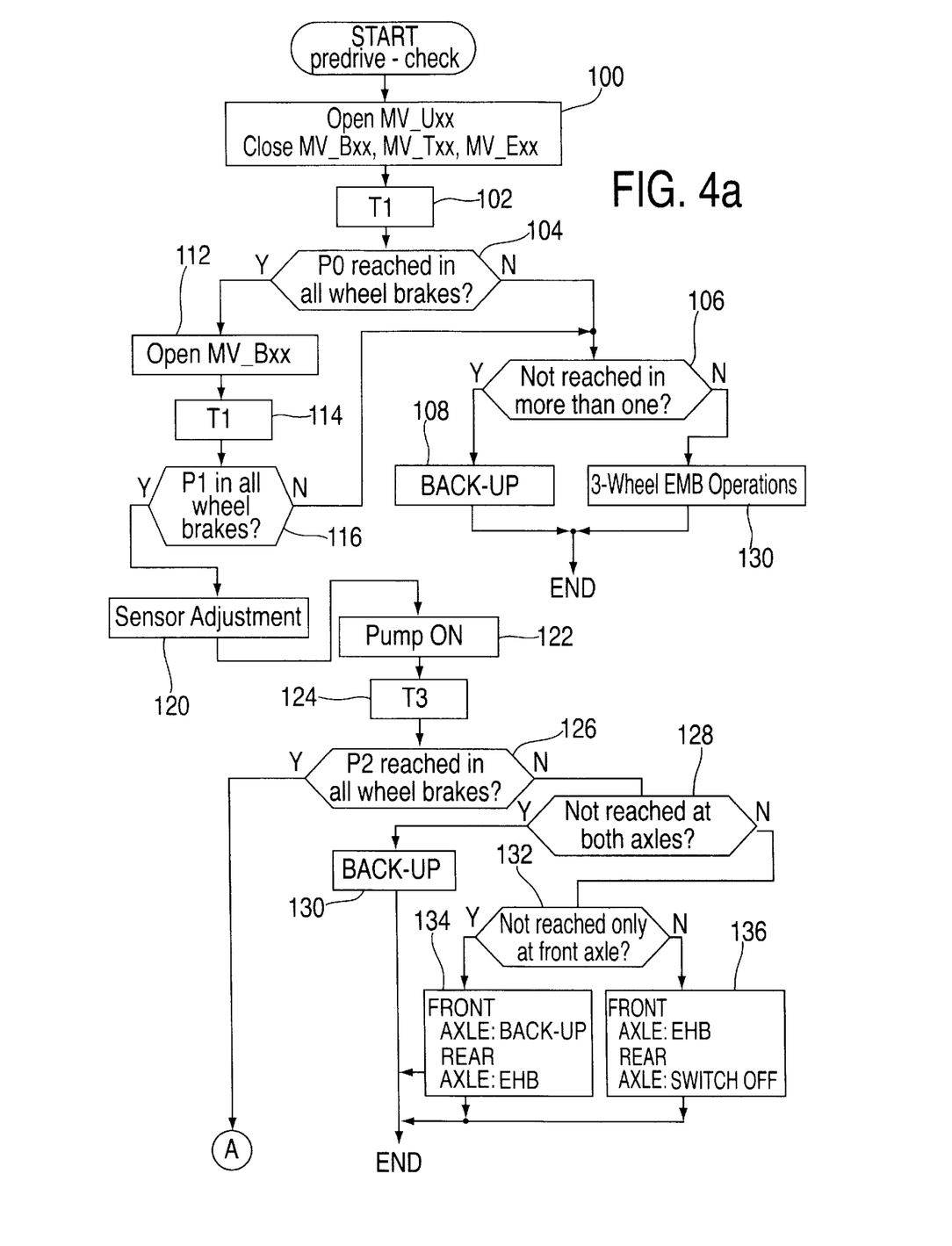
FIG. 4a shows a first portion of a flow chart which describes an implementation of the predrive test in the exemplary embodiment of the electrohydraulic braking system.
Figure 4B:
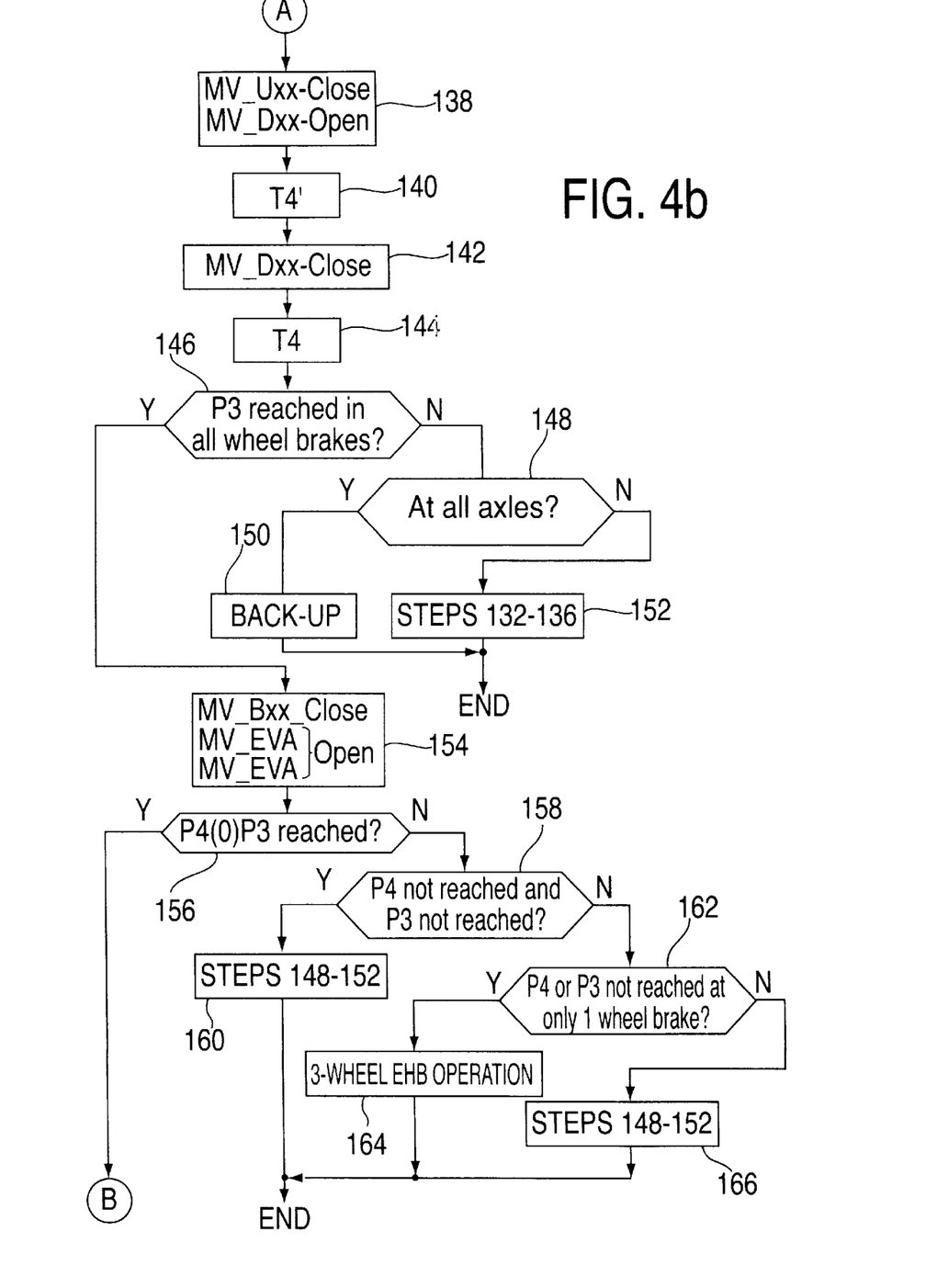
Figure 4C:
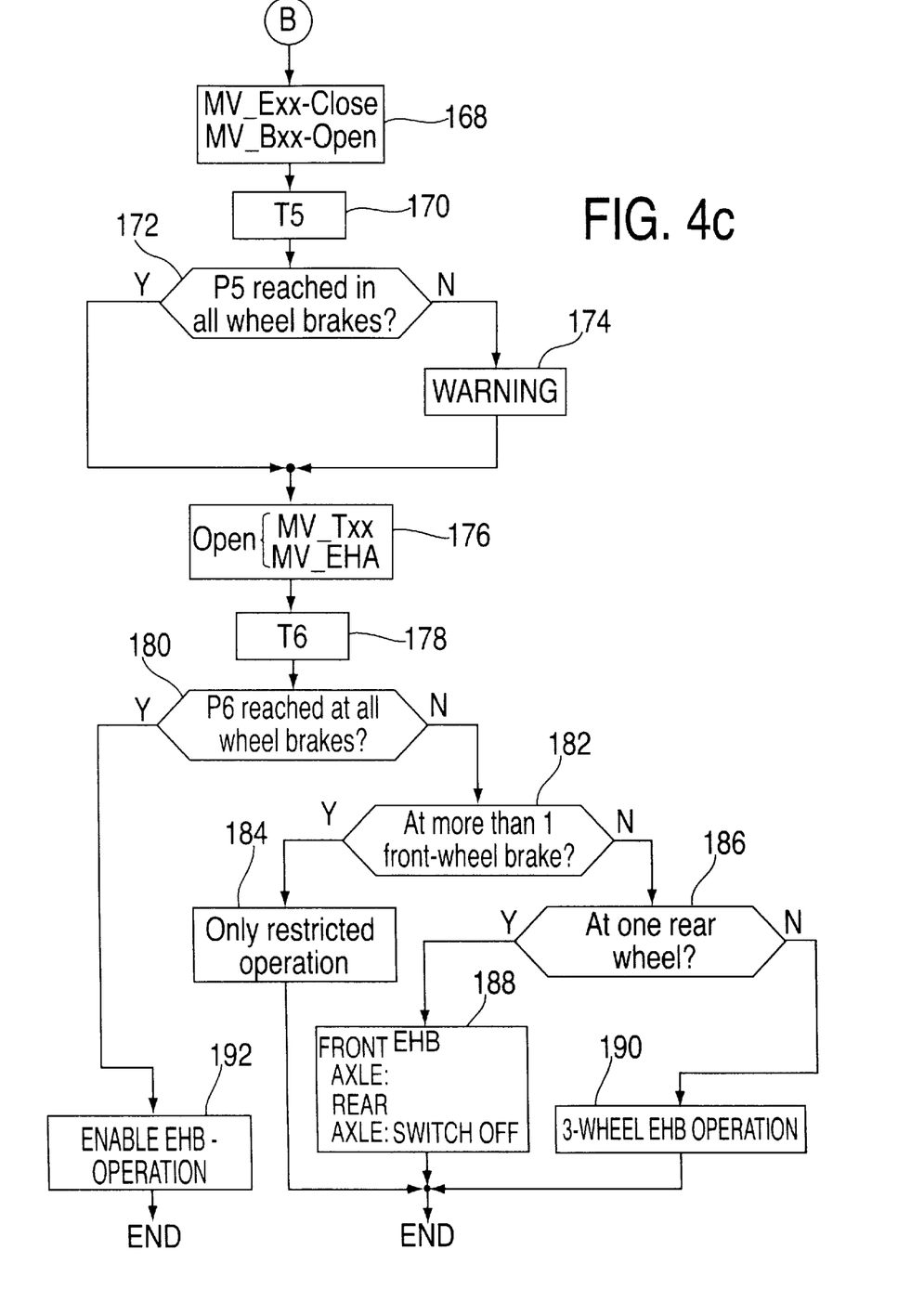

If, in one of the described phases, it is detected that the pressure level to be anticipated was exceeded or undershot by a predetermined amount at at least one wheel, in so far as possible, the fault is isolated and a secondary braking operation is initiated, the driver is warned by activating a warning lamp, and the operation of the braking system is started with a braking system being in operation under emergency conditions. An exemplary embodiment according to the present invention, which shows the allocation of the secondary braking operations to the individual fault detections, is shown in FIGS. 4*a*–4*c* as a flowchart. The flow chart shows, e.g., a program of microcomputer 102 which is executed in response to current traversing the system, when the driver is not actuating the brake pedal. To guarantee performance reliability, provision is made for further check-tests during operation which ensure correct functioning of the electrohydraulic braking system.

After the start of the program, in first step 100, control valves MV_Uxx are opened, and balance valves MV_Bxx, as well as separating valves MV_TXX, and relief valves MV_EXX are closed. In this manner, the wheel-brake pressure is brought to the accumulator pressure. After a predetermined time Ti has elapsed (step 102), a check is made in step 104 as to whether pressure value P0 to be anticipated was approximately reached in all wheel brakes. If this is not the case, a fault condition must exist. To isolate the fault condition, it is checked in step 106 whether pressure valve P0 was not reached in more than one wheel brake. If this is the case, it is obvious that there is a fault in the pressure supply (42, 44, 46 and associated circuits), so that according to step 108, it is necessary to go over to a complete secondary braking operation (hydraulic back-up), in which all valves are switched over into a currentless state. The driver then injects hydraulic brake pressure into the wheel brakes of the front axle via the actuation of brake pedal 12.

If the pressure level is not reached at only one wheel brake, according to step 110, a "3-wheel EHB-operation (e.g., an electrohydraulic braking operation) is initiated as a secondary braking operation. During this operation, the balance valve of the axle at which the fault was detected is closed. Thus, only one wheel of this axle is braked. The other wheel is not braked. The yawing moment which may occur is reduced by a conventional yawing-moment build-up deceleration arrangement. All wheel-individual functions such as anti-lock protection, ASR traction control, operating-dynamics control, etc., as well as functions such as an electronic braking-force distribution, etc., are adjusted or, if necessary, switched off. During the operation of the braking system in 3-wheel EHB-operation, further watchdog functions are carried out which ensure the correct functioning of the reduced electronic operation.

If step 104 has revealed that the pressure to be anticipated was reached in all the wheel brakes, balance valves MV_Bxx are opened in step 112. After time T2 provided for this phase has elapsed (step 114), a check is made in step 116 as to whether pressure P1 to be expected is present in all the wheel brakes. If this is not the case, the process is continued with steps 106 through 110.

If the check test in step 116 has revealed that the braking system is operating properly, according to step 120, the pressure-sensor adjustment is implemented, and in the following step 122, the accumulator pressure pump is switched on for a time span less that T3. In this manner, the pressure at the wheel brakes is further increased. After a predetermined time T3 has elapsed according to step 124, it is then checked at the end of this phase III in step 126 whether pressure P2, to be expected in each case, is reached at all the wheel brakes. If this is not the case, according to step 128, it is checked whether it is not reached at both axles. In this case, a serious fault must be assumed, e.g., a fault in accumulator pressure pump 42, a leakage in the area of the pressure supply, or a considerable gas constituent in the hydraulic fluid, so that according to step 130, a complete back-up is initiated. If the pressure value is not reached at only one axle, it is checked in step 132 whether this is the front axle. In this case, a fault exists, e.g., in the area of the media isolators, there is a leakage in the area of the front-axle pressure modulation, etc., so that the hydraulic back-up is switched on at the front axle, while the correctly functioning rear axle remains in electronic closed-loop control. If the pressure to be expected was not reached at the rear-wheel brakes, then the correctly functioning front-axle brake in braked in the electronically controlled operation, while the rear-axle brakes are switched off (currentless intake valves). During this secondary braking operation, the part of the braking system controlled electronically in each case continues to be monitored for faults.

If step 126 has revealed that the pressure to be anticipated was reached at all the wheel brakes, according to step 138, intake valves MV_Uxx are closed, and discharge valves MV_Dxx are opened in a controlled manner. After a predetermined time T4' has elapsed (step 140), during which the discharge valves are traversed by current, discharge valves MV_Dxx are closed again in step 142. In this manner, a specific predefined pressure is reduced. Instead of a complete opening of the discharge valves, in other exemplary embodiments, the pressure is reduced by the pressure regulator. This improves (e.g., decreases) the noise generation. After time T4 provided for phase IV has elapsed (step 144), a check is made in step 146 as to whether pressure P3, to be anticipated after the expiration of this phase, was reached at all the wheel brakes. If this is not the case, it is checked in step 148 whether this is the case at all the axles. In this case, a clog in the return line must be assumed, for example, so that a complete hydraulic back-up is initiated according to step 150. If only one axle is affected, then a defect in one of the discharge valves must be assumed, so that a secondary braking operation corresponding to steps 132–136 is initiated.

If step 146 has revealed that the pressure was reached at all the wheel brakes, with the initiation of phase V in step 154, balance valves MV_Bxx are closed, and one relief valve is opened in each case at the front and rear axle. Thereupon, in step 156 it is checked whether the wheel pressure to be expected in each case is reached. For the wheel brakes for which the relief valve is open, this is the value 0 (P4); at the others, it is the previous value (P3). If the pressure value is not reached at one wheel, in step 158, it is checked whether both P4 and P3 were not reached. If this is the case, then, for example, there is a fault in the discharge valve in question, and a leakage in the area of the wheel brake. In this case, according to step 160, the procedure is analogous to the procedure of steps 148–152. If either P4 or P3 is not reached at only one wheel brake (step 162), then this wheel brake is isolated according to step 164 in 3-wheel EHB-operation. If P3 or P4 was not reached at two or more wheel brakes, then according to step 166, the procedure corresponds to steps 148–152.

If, according to step 156, phase V was also concluded properly, in step 168 the opened relief valves are closed, and balance valves MV_Bxx are opened. After time T5 provided for phase V has elapsed (step 170), in step 172 it is checked whether the wheel-brake pressures have reached pressure P5 to be anticipated. If this pressure is not reached, a proper pressure equalization is not taking place between the wheel brakes of one axle, i.e., the corresponding balance valve is not opening properly. This is not a substantial restriction of the operation, so that according to step 174, the driver may be merely warned by, e.g., a warning lamp.

After step 174 or in case of a yes response in step 172, according to step 176, separating valves MV_Txx and the pressure-reduction valves at the rear axle are opened. After time T6 has elapsed according to step 178 for the last test phase, the wheel-brake pressures are checked in step 180 for value P6, namely 0. If this pressure is not reached at at least one wheel brake, in step 182, it is checked whether this is the case at more than one front-wheel brake. If this is the case, it must be assumed that both separating valves are closing incorrectly, so that according to step 184, only a restricted operation of the vehicle is possible, e.g., within the framework of a power restriction. If only one front-wheel brake is affected, a check is made in step 186 as to whether a rear-axle brake is affected. If this is not the case, the front-wheel brake allocated to this separating valve is isolated, and according to step 190, a 3-wheel EHB-operation is implemented. If a rear-axle brake is affected, according to step 188, the rear axle is switched off. If, according to step 180, the last phase of the test has also been concluded successfully, according to step 192, the EHB operation is enabled.

If, during the test, the driver inputs a driving command or actuates the brake pedal, the test is broken off immediately, and the functional reliability is ensured by check tests which are carried out during the running operation. By suitable modification (e.g. by not opening the separating valves), the test can also be performed with applied brake pedal.

If, within the framework of the predrive check, a fault is detected and a secondary braking operation is initiated, this is maintained at least for the following operating cycle. Before the start of the next operating cycle, the test is carried out once more, and in one exemplary embodiment according to the present invention, given a braking system free from defects, the normal operation is again commenced.

Preferably, the test is performed in an optimized manner from the standpoint of noise and time, so that the greatest possible comfort and the fastest possible availability of the brake is attained for a driver. For this purpose, the pressure regulator is utilized for the pressure build-up and pressure reduction, the setpoint value of the pressure regulator being changed in a ramp shape along these lines, until achieving the pressure value provided for the test.

What is claimed is:

1. A method for testing a braking system, the braking system including electrically operable valve arrangements, each of the electrically operable valve arrangements being allocated to a respective one of wheel brakes, the method comprising the steps of:

electrically detecting a braking input generated by a driver;

converting the braking input into at least one driving signal;

controlling a pressure of a pressure supply in the braking system using the electrically operable valve arrangements, the pressure being controlled as a function of the at least one driving signal to generate wheel-brake pressure values;

before a start of travel, performing a self-test of the braking system, the self-test including a plurality of test phases, wherein first predetermined actuations of the electrically operable valve arrangements and second predetermined actuations of the pressure supply are allocated to the test phases;

during the self-test and for each of the respective wheel brakes, checking an operatability of a respective one of the electrically operable valve arrangements to detect a fault, wherein the operability is checked by comparing the wheel-brake pressure values with predetermined pressure values at an end of the test phases, the fault being detected if a pressure deviation is determined in at least one of the respective wheel brakes; and initiating a secondary braking operation if the fault is detected.

2. The method according to claim 1, wherein the secondary braking operation is maintained for at least a subsequent operating cycle.

3. The method according to claim 1, further comprising the step of:

during one of the test phases, building-up the pressure of at least one of the respective wheel brakes to a accumulator pressure level by opening at least one pressure-intake valve at each of the respective wheel brakes.

4. The method according to claim 3, wherein, if the accumulator pressure level is not reached in only one of the respective wheel brakes, the secondary braking operation is initiated by electronically controlling three of the respective wheel brakes, and one of the respective wheel brakes is switched off, and further comprising the step of:

if the accumulator pressure level is not reached in more than one of the respective wheel brakes, initiating a complete hydraulic back-up procedure.

5. The method according to claim 1, further comprising the step of:

during one of the test phases, opening a valve to produce a pressure balance between particular brakes of the respective wheel brakes at one axle.

6. The method according to claim 5, further comprising the steps of:
   if the pressure balance is not produced, performing one of the following substeps:
      completely switching-over the secondary braking operation to a hydraulic back-up operation, performing the hydraulic back-up operation only at front axle brakes of the respective wheel brakes, and
      switching-off rear-axle brakes of the respective wheel brakes; and
   if no fault is detected, adjusting pressure sensors at the respective wheel brakes.

7. The method according to claim 1, further comprising the step of:
   during one of the test phases, switching-on an accumulator pressure pump to check a charging operation of an accumulator.

8. The method according to claim 7, further comprising the steps of:
   if the wheel-brake pressure values do not reach the predetermined pressure values in all of the respective wheel brakes, initiating a complete back-up procedure;
   if the wheel-brake pressure values do not reach the predetermined pressure values only in front axle brakes of the respective wheel brakes, hydraulically controlling only the front axle brakes; and
   if the wheel-brake pressure values do not reach the predetermined pressure values only in rear axle brakes of the respective wheel brakes, switching-off the rear axle brakes.

9. The method according to claim 1, further comprising the step of:
   during one of the test phases, opening pressure-reduction valves in a predetermined manner, and lowering a pressure level in the respective wheel brakes to a predetermined value.

10. The method according to claim 9, further comprising the step of:
   if the wheel-brake pressure values do not reach the predetermined pressure values in all of the respective wheel brakes, performing a complete hydraulic back-up procedure at only one of front axle brakes of the respective wheel brakes, and switching-off rear axle brakes of the respective wheel brakes.

11. The method according to claim 1, further comprising the step of:
   during one of the test phases, reducing the pressure to zero in at least one wheel brake of the respective wheel brakes at a particular axle by opening a discharge valve.

12. The method according to claim 11, wherein, when the pressure is not reduced to zero at only one of the respective wheel brakes, the secondary braking operation is initiated as a three-wheel EHB operation.

13. The method according to claim 4, further comprising the step of:
   warning the driver if a pressure-balance operation is not effected.

14. The method according to claim 1, further comprising the step of:
   during one of the test phases, opening separating valves.

15. The method according to claim 14, further comprising the steps of:
   if a complete pressure reduction does not occur, initiating a 3-wheel EHB operation; and
   if the complete pressure reduction does not occur at more than one front wheel brake of the respective wheel brakes, restricting an operation of a motor vehicle.

16. The method according to claim 1, further comprising the step of:
   during the self-test, checking the pressure supply.

17. An apparatus for testing a braking system, the braking system including electrically operable valve arrangements, each of the electrically operable valve arrangements being allocated to a respective one of wheel brakes, the apparatus comprising:
   means for electrically detecting a braking input generated by a driver;
   means for converting the braking input into at least one driving signal;
   means for controlling a pressure of a pressure supply in the braking system using the electrically operable valve arrangements, the pressure being controlled as a function of the at least one driving signal to generate wheel-brake pressure values;
   means for performing a self-test of the braking system before a start of travel, the self-test including a plurality of test phases, wherein first predetermined actuations of the electrically operable valve arrangements and second predetermined actuations of the pressure supply are allocated to the test phases;
   means for checking an operability of a respective one of the electrically operable valve arrangements to detect a fault during the self-test and for each of the respective wheel brakes, wherein the operability is checked by comparing the wheel-brake pressure values with predetermined pressure values at an end of the test phases, the fault being detected if a pressure deviation is determined in at least one of the respective wheel brakes; and
   means for initiating a secondary braking operation if the fault is detected.

18. An apparatus for testing a braking system, the braking system including electrically operable valve arrangements, each of the electrically operable valve arrangements being allocated to a respective one of wheel brakes, the apparatus comprising:
   a detecting arrangement for electrically detecting a braking input generated by a driver;
   a converting arrangement for converting the braking input into at least one driving signal;
   a controlling arrangement for controlling a pressure of a pressure supply in the braking system using the electrically operable valve arrangements, the pressure being controlled as a function of the at least one driving signal to generate wheel-brake pressure values;
   a self-test performing arrangement for performing a self-test of the braking system before a start of travel, the self-test including a plurality of test phases, wherein first predetermined actuations of the electrically operable valve arrangements and second predetermined actuations of the pressure supply are allocated to the test phases;
   a checking arrangement for checking an operability of a respective one of the electrically operable valve arrangements to detect a fault during the self-test and for each of the respective wheel brakes, wherein the operability is checked by comparing the wheel-brake pressure values with predetermined pressure values at an end of the test phases, the fault being detected if a pressure deviation is determined in at least one of the respective wheel brakes; and
   a secondary braking initiating arrangement for initiating a secondary braking operation if the fault is detected.

* * * * *